United States Patent [19]

Eberle

[11] 4,198,736
[45] Apr. 22, 1980

[54] AUTOMATED BURNISHING APPARATUS AND METHOD FOR BURNISHING THE TERMINAL POSTS OF LEAD-ACID BATTERIES

[75] Inventor: William J. Eberle, Reading, Pa.

[73] Assignee: General Battery Corporation, Reading, Pa.

[21] Appl. No.: 887,063

[22] Filed: Mar. 16, 1978

Related U.S. Application Data

[60] Continuation-in-part of Ser. No. 697,786, Jun. 21, 1976, Pat. No. 4,119,137, which is a continuation of Ser. No. 618,772, Oct. 2, 1975, Pat. No. 3,980,126, which is a continuation-in-part of Ser. No. 432,545, Jan. 11, 1974, Pat. No. 3,954,216, which is a continuation-in-part of Ser. No. 395,528, Sep. 10, 1973, Pat. No. 3,861,575, which is a division of Ser. No. 184,338, Sep. 28, 1971, abandoned.

[51] Int. Cl.² .................. B21C 37/30; B23B 39/16; B23B 39/00
[52] U.S. Cl. .................. 29/90 R; 29/730; 408/42; 408/53; 408/72 R
[58] Field of Search .............. 29/90 R, 76 R, 78, 730, 29/731; 408/3, 42, 43, 46, 49, 50, 51, 52, 53, 72; 15/236 C, 104.2, 104.15, 104.16, 179, 160, 104.04, 104.01, 21 R, 21 A, 21 B, 21 C, 21 D, 21 E, 23, 71, 72, 73, 198; 164/271

[56] References Cited

U.S. PATENT DOCUMENTS

| | | | |
|---|---|---|---|
| 1,423,378 | 7/1922 | Wesson | 29/90 R |
| 1,890,073 | 12/1932 | Boone | 408/72 |
| 2,204,516 | 6/1940 | Stone | 29/90 R |
| 2,250,845 | 7/1941 | Stefano | 408/42 |
| 2,600,338 | 6/1952 | Starr | 15/160 X |
| 2,734,577 | 2/1956 | Spiller et al. | 408/46 |
| 3,188,674 | 6/1965 | Hobbs | 15/179 |
| 3,383,727 | 5/1968 | Hanson | 15/198 X |
| 3,545,309 | 12/1970 | Calhoun | 408/53 X |
| 3,885,289 | 5/1975 | Tanaka | 29/730 |
| 3,980,126 | 9/1976 | Eberle | 164/271 |

Primary Examiner—Harrison L. Hinson
Attorney, Agent, or Firm—Benasutti Associates, Ltd.

[57] ABSTRACT

A novel burnishing apparatus and method for burnishing the terminal posts of lead-acid batteries is disclosed. The burnishing brushes are adjustably mounted to service batteries with various terminal posts spacings. After indexing and alignment, each battery to be processed is located and clamped by a battery processing head, after which the burnishing carriage which is slidably mounted thereon is moved relatively towards and away from the battery terminals to bring the burnishing brushes into contact with the battery terminals to effect the burnishing operation. The direction of rotation of the burnishing brushes is reversed when the burnishing brush carriage begins to withdraw from the battery terminals.

7 Claims, 2 Drawing Figures

AUTOMATED BURNISHING APPARATUS AND METHOD FOR BURNISHING THE TERMINAL POSTS OF LEAD-ACID BATTERIES

CROSS-REFERENCE TO RELATED APPLICATIONS

The present application is a continuation-in-part of my prior co-pending patent application Ser. No. 697,786, filed June 21, 1976, now U.S. Pat. No. 4,119,137, entitled, "Automated Post Burn Station" which in turn is a continuation of U.S. Patent application Ser. No. 618,772, filed Oct. 2, 1975, now U.S. Pat. No. 3,980,126, entitled "Automated Post Burn Station", which in turn is a continuation-in-part of Ser. No. 432,545, filed Jan. 11, 1974, now U.S. Pat. No. 3,954,216, entitled "Apparatus For Thermal Relay Welding" which in turn is a continuation-in-part of U.S. Patent application Ser. No. 395,528, filed Sept. 10, 1973, now U.S. Pat. No. 3,861,575, dated Jan. 21, 1975, which in turn is a division of application of U.S. Ser. No. 184,338, filed Sept. 28, 1971, now abandoned, which applications are specifically incorporated by reference as if fully set forth herein.

BACKGROUND OF THE INVENTION

The present invention generally relates to battery processing apparatuses. It also relates to apparatuses and methods which are used to burnish, polish or otherwise provide a suitable attractive metallic finish to the terminal post of lead-acid batteries prior to shipment and/or sale.

It is often desirable to burnish battery terminal posts prior to the shipment and/or sale since highly polished battery terminals lend an attractive appearance to the overall look of the lead-acid storage battery and further provide a clean surface to which good electrical connections can be made. Heretofore, such burnishing has commonly been preformed either by a hand sanding, abrading or brushing operation or, alternatively, by utilizing a hand-held electric or air motor driven brush to polish the exterior surfaces of those terminals. When a motorized brush is utilized, the brush may be a cylinder having a multitude of inwardly depending bristles formed therein which define an interior brushing surface which is complementally configured to the exterior of the battery terminal to be burnished. Unfortunately, in continued service such bristles tend to bend and the brushing surface defined thereby are enlarged. Initially this bending results from the operator's inability to introduce and maintain the brushes in an aligned position throughout the buffing operation. Then, in order to obtain a suitably burnished surface, the operator must begin to manipulate the brush with respect to the exterior of the battery terminal in order contact all surfaces thereof. Unfortunately, this manipulation, such as tilting, orbiting, etc. of the brush further accentuates the problem of deforming or bending the metallic bristles, with the result that such brushes must be frequently replaced. Additionally, prior to replacement, the manipulation, tilting, etc. of the burnishing brushes with respect to the axes of the terminal tend to over burnish certain areas while leaving other areas unburnished. Since lead is a relatively soft metal, severe over burnishing of particular portions could, in extreme instances, affect the appearance and/or final connections made to those terminals.

SUMMARY OF THE INVENTION

The present invention provides a novel automated burnishing apparatus which sequentially processes batteries by aligning those batteries under a plurality of conventional burnishing brushes, using a location template for locating and clamping those batteries in the vicinity of the terminals to be burnished, and then moving the burnishing brushes axially into and out of contact with the portions to be burnished, while reversing the direction of rotation of the burnishing brushes during the burnishing operation.

Accordingly, a primary object of the present invention is the provision of an automated apparatus for burnishing battery terminal posts.

Another aim of the present invention is the burnishing of battery terminals of lead-acid batteries using a novel burnishing method.

A further aim of the present invention is the provision of an apparatus and method of using same which minimizes burnishing brush wear while maximizing the quality and number of terminals which can be efficiently burnished.

These and other objects of the present invention will become apparent from the following more detailed description.

DETAILED DESCRIPTION OF THE DRAWINGS

DESCRIPTION OF THE PREFERRED EMBODIMENT

Figure 1:
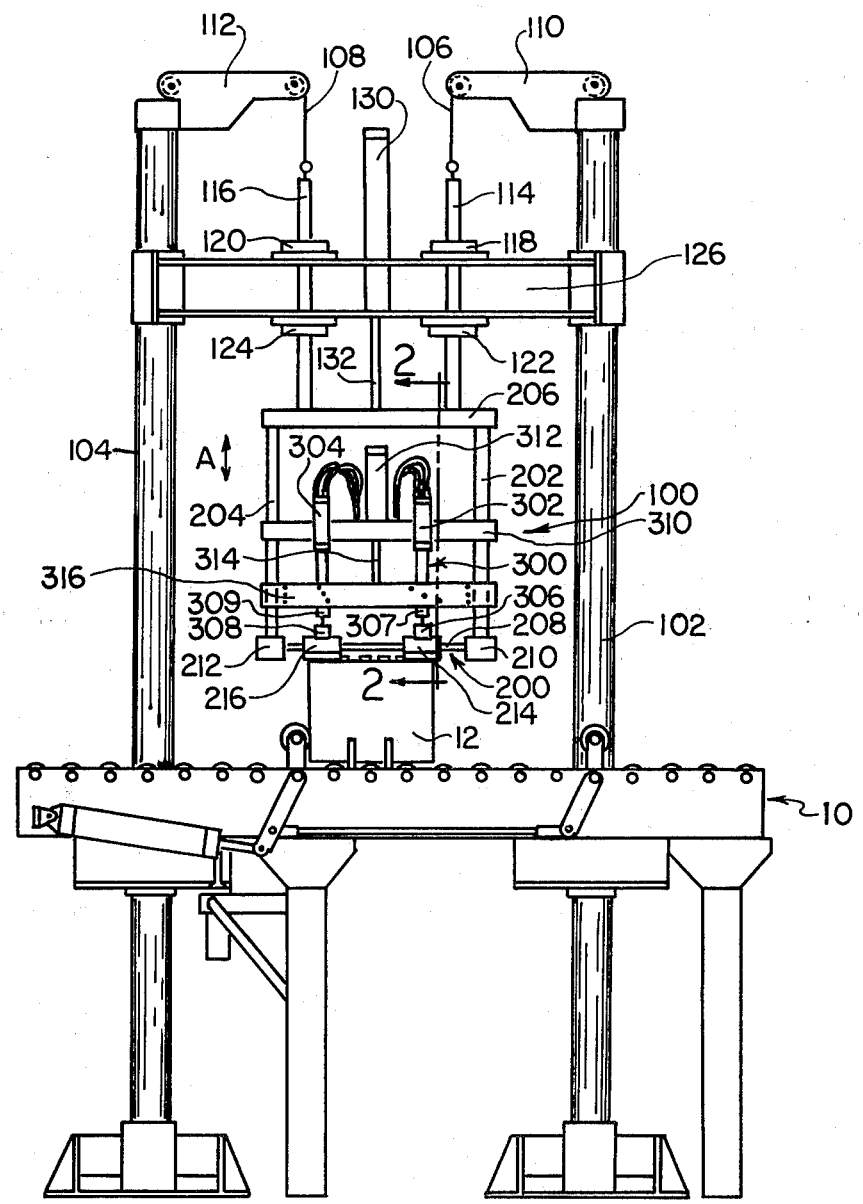
FIG. 1 is a front view of the preferred embodiment apparatus of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to the drawings, the automated burnishing apparatus of the present invention generally comprises a conveyor means 10 for sequentially indexing and aligning automotive storage batteries such as battery 12 in a battery processing position immediately under the battery processing head designated generally 100. The battery processing head 100 is supported by main supports 102 and 104. These main supports are hollow and have counterweights disposed therein which, together, approximately equal the weight of the battery processing head 100. These counterweights are attached to cables 106 and 108 which are run across pulley mechanisms 110 and 112 and are attached to battery processing head support rods 114 and 116 which are journalled within support rod bushings 118, 120, 122 and 124. These bushings are mounted on main transverse support member 126 which spans between main supports 102 and 104. The battery processing head 100 is caused to move generally towards and away from battery 12 by means of battery processing head cylinder 130 which is mounted on main transverse support member 126. Accordingly, relative movement of cylinder rod 132 with respect to cylinder 130 causes the relative movement of the battery processing head 100 in the directions as shown by double-headed arrow A in FIG. 1.

As seen in FIG. 1, the battery processing head 100 generally comprises a terminal locating and clamping head designated generally 200 and a battery burnishing carriage designated generally 300 which slideably engages and reciprocates along the battery terminal locating and clamping head. The battery terminal locating and clamping head generally comprises tracking rods 202 and 204 which are spaced apart at either end by transverse track supporting member 206 at the upper end and template rod 208 and template blocks 210 and 212 at the lower end. Slideably disposed on the template rod 208 are a plurality of templates 214 and 216 which are mounted for movement along template rod 208 into positions directly over the battery terminals to be burnished. The burnishing carriage designated generally 300 comprises burnishing brush motors 302 and 304 having burnishing brushes 306 and 308 mounted respectively thereon into burnishing brush chucks 307 and 309, which are preferably insulated to prevent shorts through the apparatus. Since the burnishing or buffing operation is conducted on charged batteries immediately prior to their shipment, the preferred embodiment apparatus of the present invention is fully insulated to insure that bridging cannot take place through the apparatus. Accordingly, insulating bushings 900, 904, and 908 are utilized. Similarly, the chuck 307 of the burnishing motor 302 may be insulated while the templates 214, 216, template locater member 316 and/or motor bracket 420 are preferably either constructed of an insulating material or are provided with an insulated coating thereon to prevent electrical contact from being made with the terminal posts. If, for example, the template and locater member are constructed of aluminum, they may be hard-surface andozided to create an insulating layer thereover. Burnishing brush supporting member 310 spans between rods 202 and 204 and is fixed with respect thereto. A cylinder 312 mounted thereon through cylinder rod 314 thereof causes the main burnishing carriage support 310 and locater member 316 to move relative to the terminal post locater locating and clamping head 200 to effect the burnishing operation, as described more fully hereinafter.

Figure 2:
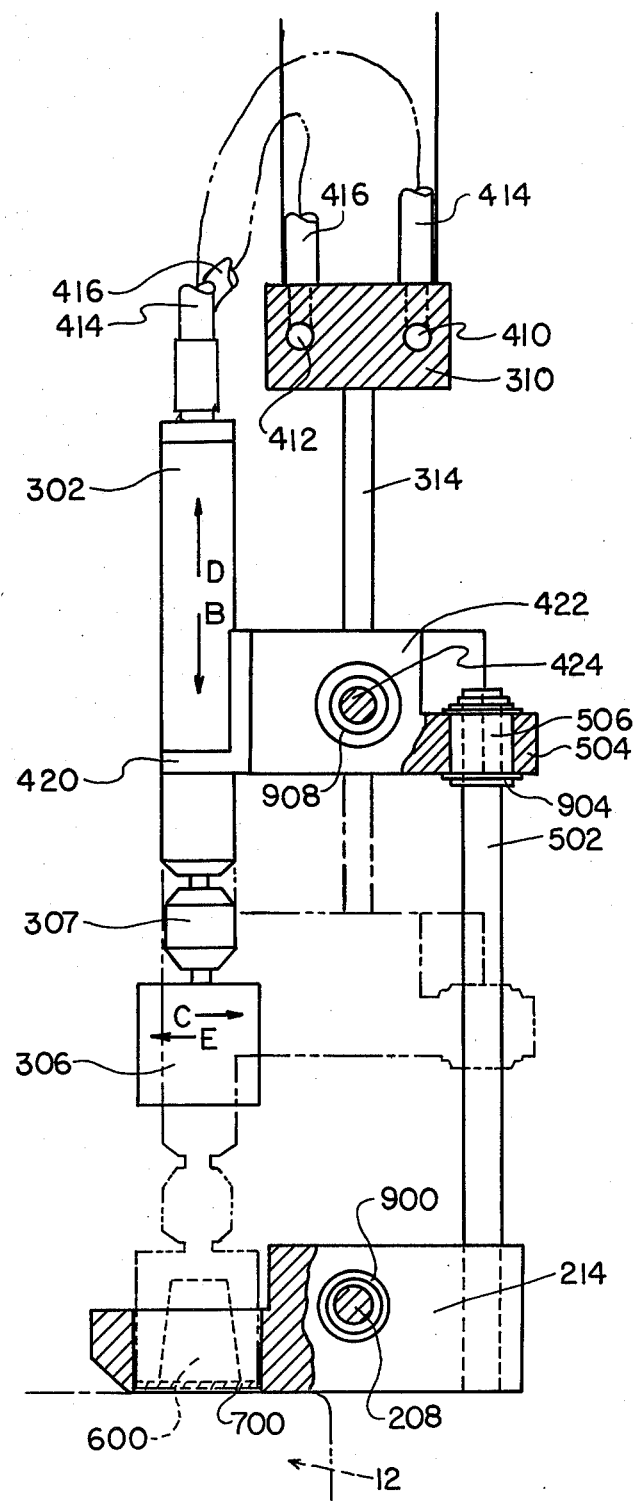
FIG. 2 is a greatly enlarged cross-section of a portion of the apparatus illustrated in FIG. 1 taken as indicated by the lines and arrows 2—2 in FIG. 1.

Referring now in particular to FIG. 2, which is a greatly enlarged side view of a portion of the apparatus shown in FIG. 1 and from which the locater plate member 316 has been removed for purposes of clarity, main transverse burnishing head support member 310 will be seen to have two fluid conduits 410 and 412 disposed therein which are adapted to supply the hoses 414 and 416 of burnishing brush air motor 302 to effect the rotation of burnishing brush 306. The air motor 302 is attached through motor bracket 420 to burnishing brush mounting block 422 which is journalled on transverse burnishing carriage rod 424 such that the burnishing brushes may be moved relative to each other to effect an appropriate spacing corresponding to the particular terminal post spacings of the batteries to be processed. The locater member 316 which is illustrated in FIG. 1 (but not shown in FIG. 2) has a plurality of openings disposed therein which mate with pins (also not shown in FIG. 2) to relatively fix the locations of the burnishing brushes with respect to each other during the burnishing operation. The particular details of this locater member are disclosed more fully in my prior U.S. Pat. Nos. 3,861,575 and 3,942,704, which are hereby incorporated herein by reference. As seen in FIG. 2, template 214 which is journalled on rod 208 is similarly fixed in position by means of interconnecting rod 502 which is journalled within bushing 506 disposed through an extension portion 504 of burnishing brush mounting block 422. As shown in FIG. 2, the top right hand corner surface of a battery designated generally 12 is shown in the battery processing position and this top surface is seen to have a raised portion 700 defined thereon disposed around the terminal post 600. This raised portion, however, is of a smaller diameter than the template, the lower surface portion of the template being complementally configured to locate on and mateably receive this raised portion 700 and to clamp seat on the remaining cover surface disposed around this raised portion. By clamping down on the top of the battery prior to and during the burnishing operation, movement of the battery which might otherwise cause uneven burnishing and uneven burnishing brush wear is substantially eliminated. Further, by encircling the battery terminal post 600 during this clamping operation, uneven stresses which might otherwise result from an automated burnishing operation are minimized, thereby reducing the possibility that delicate welds and/or seals in this vicinity may be broken by the burnishing operation. The template further ensures that the machine is set for the appropriate sized battery terminal post in that full seating of the template on the portion of the battery cover surrounding the raised portion will be effected prior to activation of cylinder 312. Thus, if no battery is engaged by the battery terminal locating and clamping head 200 as it is moved by cylinder 130 into the clamping position, or if it is prevented from moving fully into that position, as for example, by interference between the template and the raised cover portion 700 or the battery terminal itself, then the remainder of the burnishing cycle is aborted, and the locating and clamping head 200 is caused by cylinder 130 to return to its fully retracted position. As seen in FIG. 2, a cylindrical aperture is formed through the template 214 in the portion of the template which is adjacent the battery terminal in the fully seated position. This aperture is adapted to receive and act as a guide for at least a lower portion of the cylindrical burnishing brush 306. In this manner, misalignment of the burnishing brush with respect to the terminal, particularly during the "full down" positioning of the burnishing brush, is substantially prevented, thereby minimizing wear on the steel bristles located within the brush. As the burnishing brush is moved in the direction of arrow B by cylinder 312 and cylinder rod 314, the burnishing brushes are driven in a first rotational direction, for example, as illustrated by arrow C on burnishing brush 306. When the burnishing brush moved by rod 314 reaches its "full down" or burnishing position, as shown in phantom in FIG. 2, the direction of rotation of the burnishing brush is reversed, for example, to the direction of rotation illustrated by arrow E in FIG. 2, such rotational direction being continued as the brush is withdrawn in the direction of arrow D shown in FIG. 2. By reversing the direction of the burnishing brush 306 at its "full down" or burnishing position, wear on the bristles is not only reduced, but a cleaner burnish is believed to be obtained, since oxides and other materials which may have been resistant to brushing in one direction are believed to be more susceptible to removal through brushings in multiple directions. Once the burnishing carriage 300 is returned to its uppermost or "standby" position as illustrated by the solid lined drawing in FIG. 2, the battery terminal locating and clamping head 200 is retracted to its uppermost or "standby" position (not shown in the drawings) which is relatively away from the battery. The battery then may be removed by the conveyor mechanism and a new battery introduced into that position and aligned therein to subsequently receive the locating and clamping template 2 of the burnishing apparatus.

From the above, it will be seen that a relatively simple reliable automated burnishing apparatus is provided which will minimize brush wear and maximize the quality and uniformity of burnishes to be obtained on the terminals of lead-acid storage batteries.

It will be understood that various changes in the details, materials and arrangement of parts which have been herein described and illustrated in order to explain the nature of this invention may be made by those skilled in the art within the principle and scope of the invention as expressed in the following claims.

It will be further understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. An automated burnishing apparatus for burnishing at least one terminal post of a lead-acid storage battery, said apparatus comprising:
   (a) battery terminal locating means for selectively engaging at least a portion of a battery;
   (b) rotatable burnishing means movable with respect to said locating means for surrounding and burnishing a terminal post;
   (c) means mounting said burnishing means for movement toward and away from a battery while surrounding a terminal post; and
   (d) means to cause said burnishing means to rotate in one direction during movement toward a battery and in the opposite direction during movement away from a battery.

2. The invention of claim 1 wherein said locating means further comprises means for clamping a battery in a position wherein at least one of the terminals thereon is axially aligned with respect to the direction of movement of said burnishing means.

3. The invention of claim 2 wherein said locating means comprises a locating template having a first means for receiving and aligning a battery terminal with respect thereto.

4. The invention of claim 3 wherein said template further comprises means for receiving and maintaining the alignment of at least a portion of said burnishing means.

5. The invention of claim 4 wherein said apparatus comprises means for advancing and retracting said burnishing means relatively towards and away from a battery terminal to be burnished.

6. An apparatus as claimed in claim 5, wherein said burnishing means is comprised of:
   (a) a burnishing brush having a plurality of inwardly extending bustles thereon engagable with the exterior of a terminal post; and
   (b) burnishing motor means connected to said burnishing brush for rotating said brush around a terminal post, said burnishing motor means rotating said burnishing brush in opposite directions during movement of said brush toward and away from a battery, whereby changing the directions of rotation of said burnishing brush reduces bristle wear and improves the burnish quality.

7. An apparatus as claimed in claim 6, wherein said burnishing motor means is a rotary fluid-drive motor.

* * * * *